United States Patent
Byers

(10) Patent No.: US 6,219,944 B1
(45) Date of Patent: Apr. 24, 2001

(54) MANUAL DOZER

(76) Inventor: Dannie R. Byers, 7102 Meadow Green Ter., Landover, MD (US) 20785

( * ) Notice: Subject to any disclaimer, the term of this patent is extended or adjusted under 35 U.S.C. 154(b) by 0 days.

(21) Appl. No.: 09/276,746

(22) Filed: Mar. 26, 1999

Related U.S. Application Data

(60) Provisional application No. 60/079,536, filed on Mar. 27, 1998.

(51) Int. Cl.[7] ........................................... E01H 5/02
(52) U.S. Cl. ........................... 37/265; 37/285; 37/304; 37/411
(58) Field of Search ..................... 172/371; 294/1.1, 294/68.2; 37/265, 284, 285, 304, 411

(56) References Cited

U.S. PATENT DOCUMENTS

| | | | | |
|---|---|---|---|---|
| 40,850 | * | 12/1863 | McNabb | 37/304 |
| 45,715 | * | 1/1865 | Holt | 37/304 |
| 326,016 | * | 9/1885 | Burt | 37/304 |
| 631,096 | * | 8/1899 | Smith | 37/304 |
| 652,399 | * | 6/1900 | Miller | 37/304 |
| 1,079,785 | * | 11/1913 | Mason | 37/304 |
| 1,307,568 | * | 6/1919 | Wenndorf | 37/304 |
| 5,031,277 | * | 7/1991 | Coker | 15/257.3 |
| 5,048,206 | * | 9/1991 | Jones | 37/265 |
| 5,123,187 | * | 6/1992 | Zamaria | 37/265 |

* cited by examiner

*Primary Examiner*—Eileen D. Lillis
*Assistant Examiner*—Gary S. Hartmann
(74) *Attorney, Agent, or Firm*—Millen, White, Zelano & Branigan, P.C.

(57) ABSTRACT

A manual dozer comprising a frame having a front and a rear and wheels for supporting the frame and allowing the frame to roll, The frame includes a handle extending upwardly from the frame for pushing pulling and steering the frame. A container is mounted on the frame, the container having a closed rear end and an open front end. A scoop is pivoted on the frame adjacent the front end thereof and extending in front of the open front end of the container. The scoop normally assumes a down position wherein a front edge of the scope is proximate the surface over which the manual dozer rolls. An arrangement is provided for pivoting the scoop from the down position to a raised position in which the front edge of the scoop tilts back toward the opening in the container to move scooped material into the container.

13 Claims, 4 Drawing Sheets

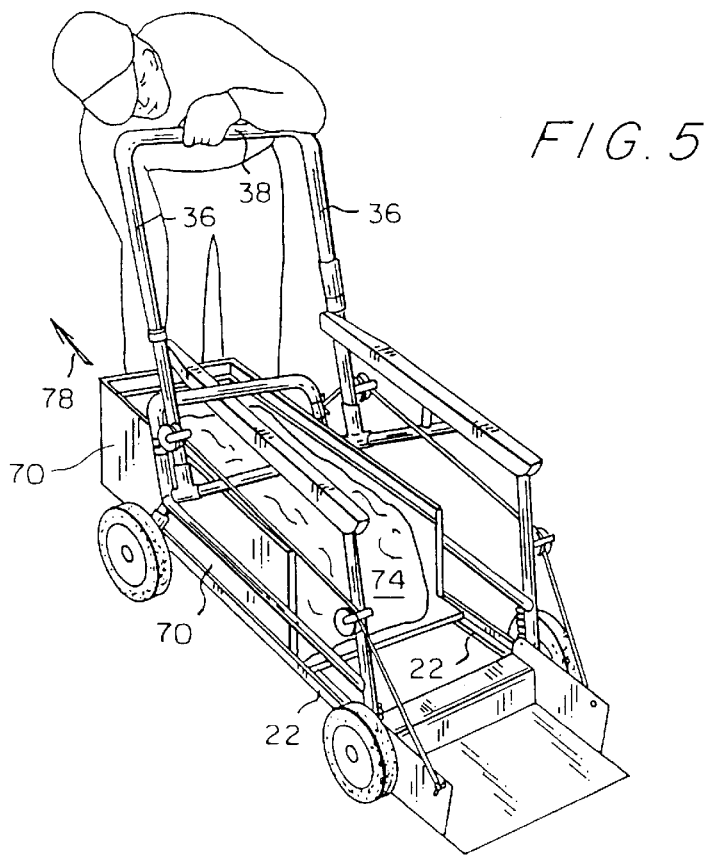
FIG. 5
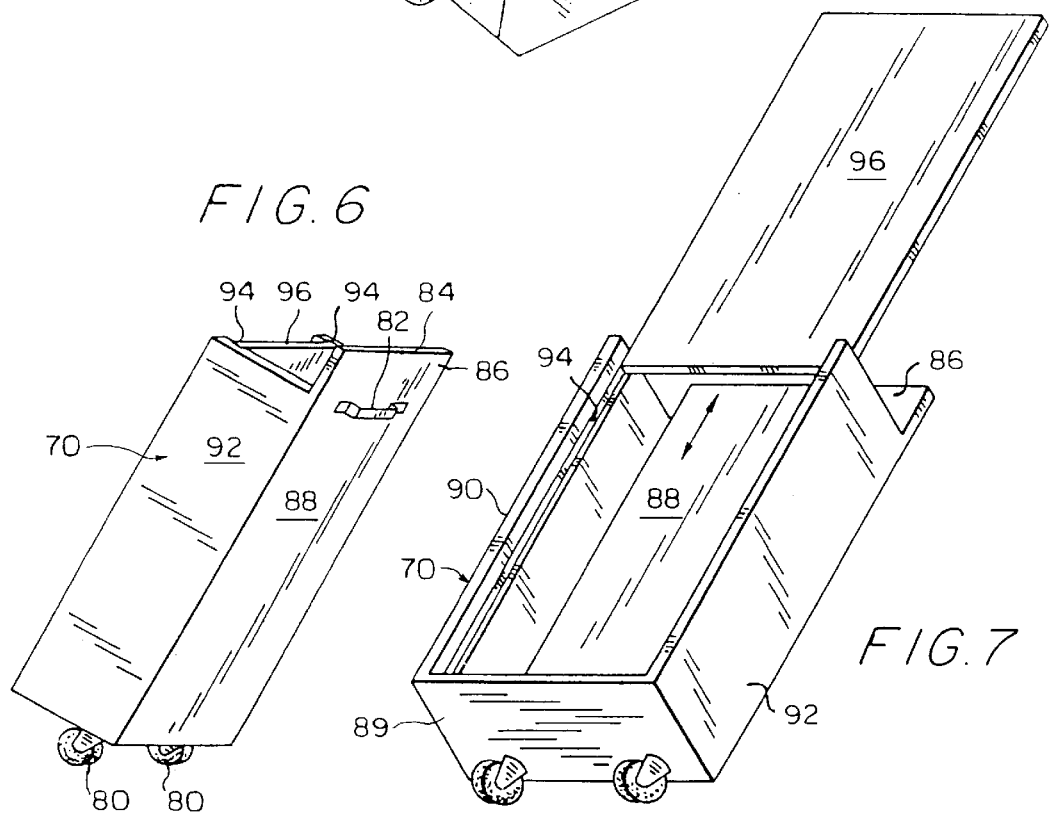
FIG. 6
FIG. 7

MANUAL DOZER

This application claims the benefit of the filing date of U.S. Provisional Application Ser. No. 60/079,536, filed Mar. 27, 1998.

FIELD OF THE INVENTION

The present invention relates to a manual dozer for lifting and moving materials such as snow, debris, sand, dirt, mulch and the like.

BACKGROUND OF THE INVENTION

Shoveling materials such as snow can be tiresome as well as dangerous work because the snow must be scooped as well as lifted and frequently thrown. Typically, the load of snow is at the end of a shovel which is unsupported, one hand serving as a fulcrum and the other applying force to lift the load. Since it is also necessary to bend over when shoveling, back injuries are not infrequent and since the snow is frequently thrown by the shoveller, exertion occasionally results in heart attacks.

There are, of course, snow blowers powered by engines which facilitate snow removal; but snow blowers are heavy, expensive devices which require maintenance. In addition, snow blowers cannot be used for other purposes.

In view of these considerations, there is a need for inexpensive devices which help with tasks such as removing snow but can also serve other purposes such as moving dirt and debris.

SUMMARY OF THE INVENTION

A manual dozer is configured to lift heavy objects, shovel dirt piles and the like and to remove snow from sidewalks and side streets. The dozer may have other uses in addition to these initially set forth uses.

The present invention relates to a manual dozer comprising a frame having a front and a rear and wheels for supporting the frame and allowing the frame to roll. The frame includes a handle extending upwardly from the frame for pushing, pulling and steering the frame. A container is mounted on the frame, the container having a closed rear end and an open front end. A scoop is pivoted on the frame adjacent the front end thereof and extends in front of the open front end of the container, the scoop normally assuming a down position wherein a front edge of the scoop is proximate the surface over which the manual dozer rollers. An arrangement is provided for pivoting the scoop from the down position to a raised position in which the front edge of the scoop tilts back toward the opening in the container to move the scooped material into the container.

In a more specific aspect, the arrangement for pivoting the scoop is located at the rear of the frame and is operated by foot.

BRIEF DESCRIPTION OF THE DRAWINGS

FIG. 1 is a perspective view showing the manual dozer according to this invention approaching a pile of material, such as snow, debris, dirt, leaves or the like;

FIG. 5 is a perspective view showing the retainer being removed from a chassis which carries the container;

FIG. 6 is a side perspective view of the container;

FIG. 7 is a perspective view showing a cover which is detachably slidable on the container;

DETAILED DESCRIPTION

Figure 1:
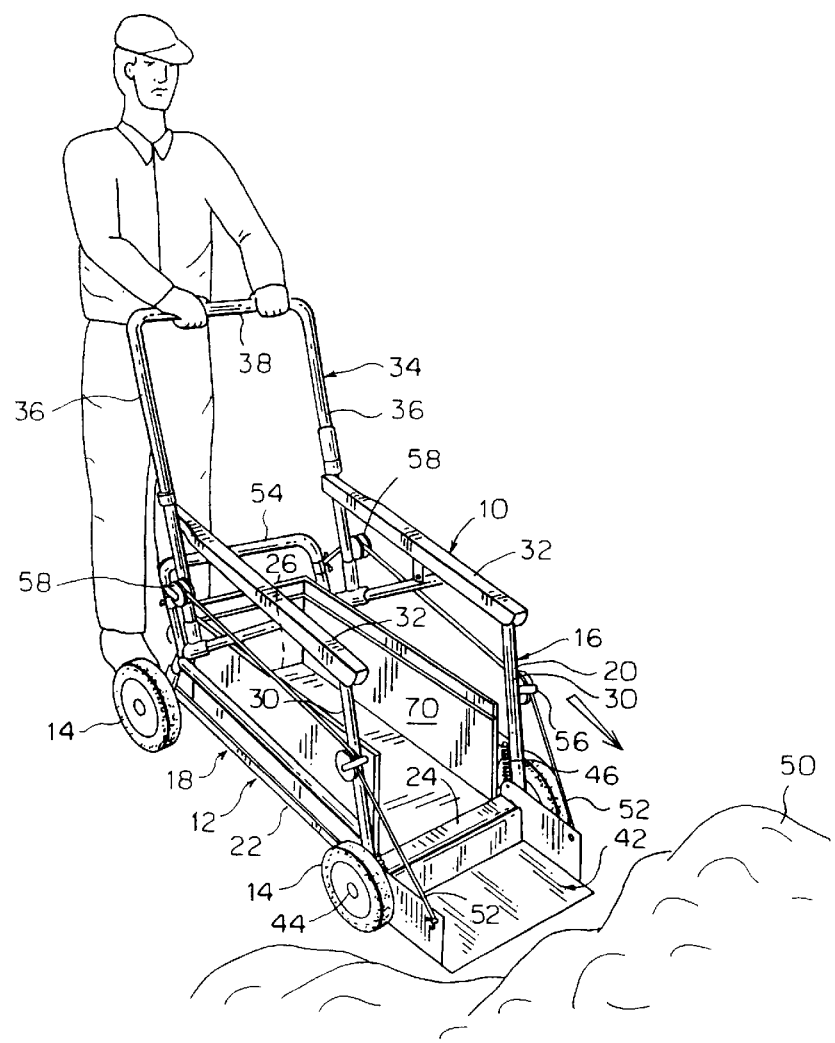

Referring now to FIG. 1, there is shown a manual dozer (10) configured in accordance with the principles of the present invention. The dozer (10) has a chassis (12) which is supported by four wheels (14) disposed at the front of the chassis and disposed at the rear of the chassis. Chassis (10) includes a frame (16) having a base portion (18) and an upright side portion (20). The base portion (18) is comprised of a pair of side rails (22) and front and rear rails (24 and 26), shown in dotted lines.

The upright frame portion (20) is comprised of vertical struts (30) which are connected to upper rails (32) to a rear handle section (34), the rear handle section (34) being comprised of upright struts (36) joined by a crossbar (38). The crossbar (38) provides a handle which the operator uses to push the manual dozer (10).

Figure 2:
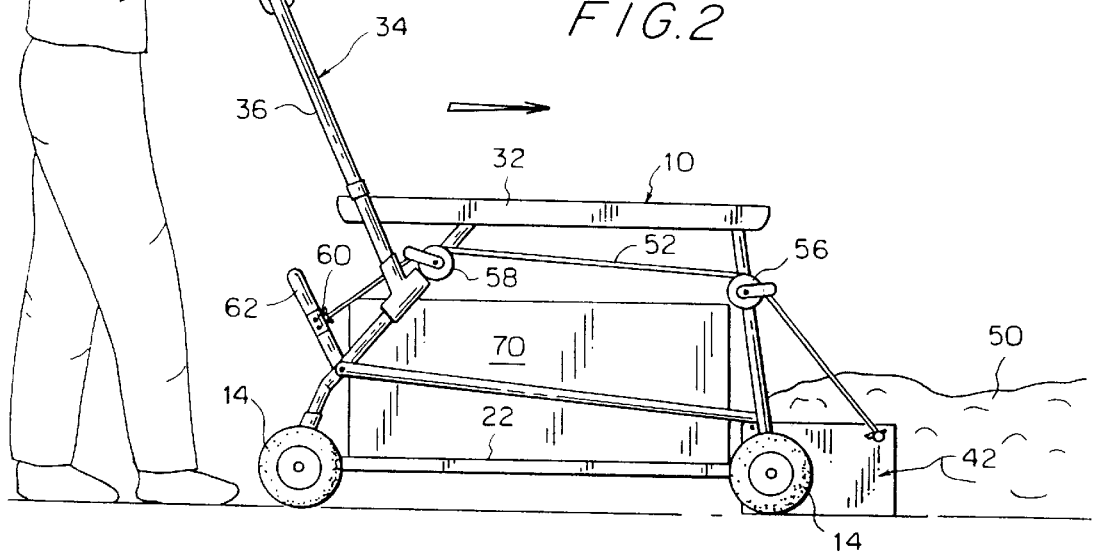
FIG. 2 is a side view showing the dozer engaging the material.
Figure 3:
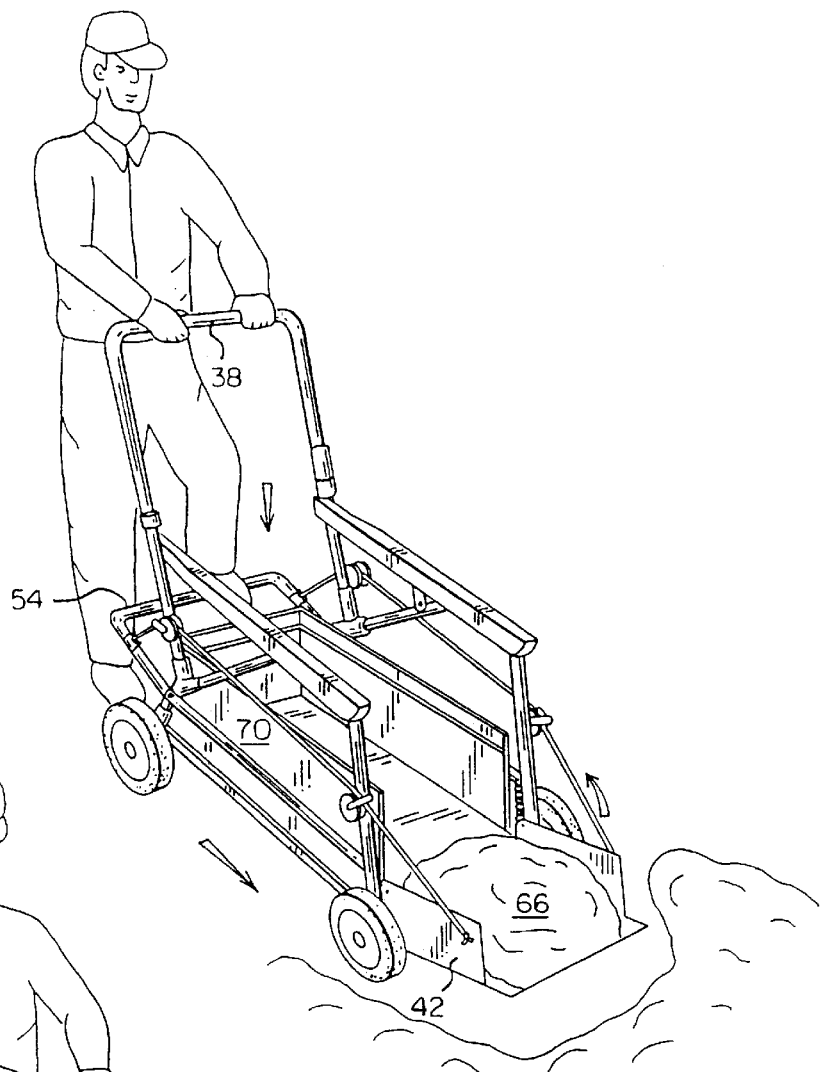
FIG. 3 is a top perspective view similar to FIG. 1 showing a scoop portion of the dozer lifting material into a container portion of the dozer.

At the front end of the manual dozer (10), there is positioned a pivoted scoop (42) with a front edge (43) for sliding under a load (50). The scoop 42 is pivoted approximate an axel (44) of the front wheels (14) from the position of FIGS. 1 and 2 to the positions of FIGS. 3 and 4. A pair of coil springs (46) (only one of which is shown) bias the scoop to the position of FIGS. 1 and 2 so that it is usually positioned to scoop up material illustrated by the pile (50). The material (50) may be any type of material, such as snow, dirt, debris, leaves, sawdust or any other type of material which the scoop may handle. Additional materials may include gravel, bricks or relatively large solid objects. In order to pivot the scoop (42) from the position of FIGS. 1 and 2 to that of FIGS. 3 and 4, the pivoted scoop (42) is connected by a pair of cables (52) to a footbar (54) that is pivoted on the frame (16) above the rear wheels (14). A pair of front pulleys (56) and a pair of rear pulleys (58) support the cables (52), the cables (52) having ends (60) which are anchored to side bars (62) on the footbar (54).

Figure 4:
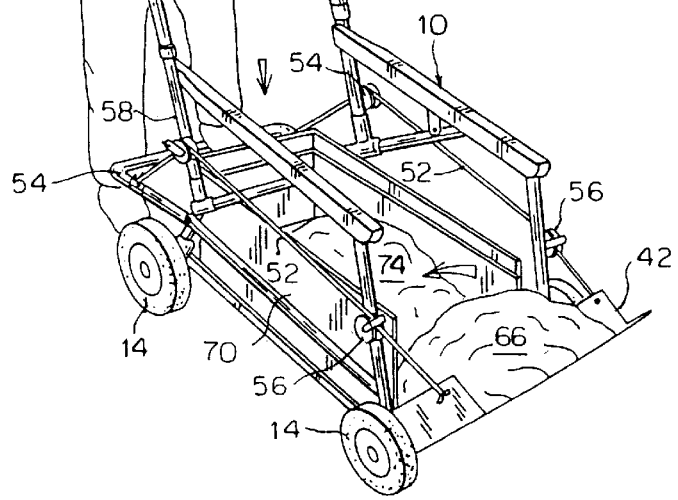
FIG. 4 is a view similar to FIG. 3 but showing an accumulation of material in the container and additional material being added to the container.

As is seen in FIG. 4, when the operator steps on the footbar (54), the scoop (42) lifts a portion (66) of the material which has been separated from the pile (50) so that the material (66) can slide into a container (70). Sliding of the material (66) into the container (70) may be facilitated by tilting the manual dozer (10) about the axis of the rear wheels (14). The rear wheels (14) may be placed further forward than illustrated in order to facilitate this tilting of the manual dozer (10). As is seen in FIG. 4, several loads of the material (50) may be accumulated in the container (70) by the afore described operation to provide an accumulation (74) of the material (50) within the container (70).

As is seen in FIG. 5, when the container (70) is full, the operator slides the container rearwardly in the direction of the arrow (78) so as to dump the material (74) where desired. After the container (70) has been emptied, the container is slid back into the dozer (10). Preferably, the container (70) is supported on the side rails (22) which are preferably L-shaped in cross-section to provide a shelf portion upon which the container (70) rests.

Referring now to FIGS. 6 and 7, it is seen that the container (70) has thereon a pair of wheels (80) and a handle (82). The handle (82) may be a projecting handle or perhaps simply a slot such as the slot (84) (shown in dotted lines) which is formed in a lip portion (86) of a floor (88) of the container. The container has a back wall (89) to which the wheels (80) are fixed and a pair of side walls (90 and 92) which form an enclosure for the material (74). The side walls (90 and 92) may optionally have slots (94) therein which slidably receive a cover (96). By providing wheels (80), the container (70) may be easily transported and by providing a removable sliding cover (96) the container may be easily emptied.

Figure 8:
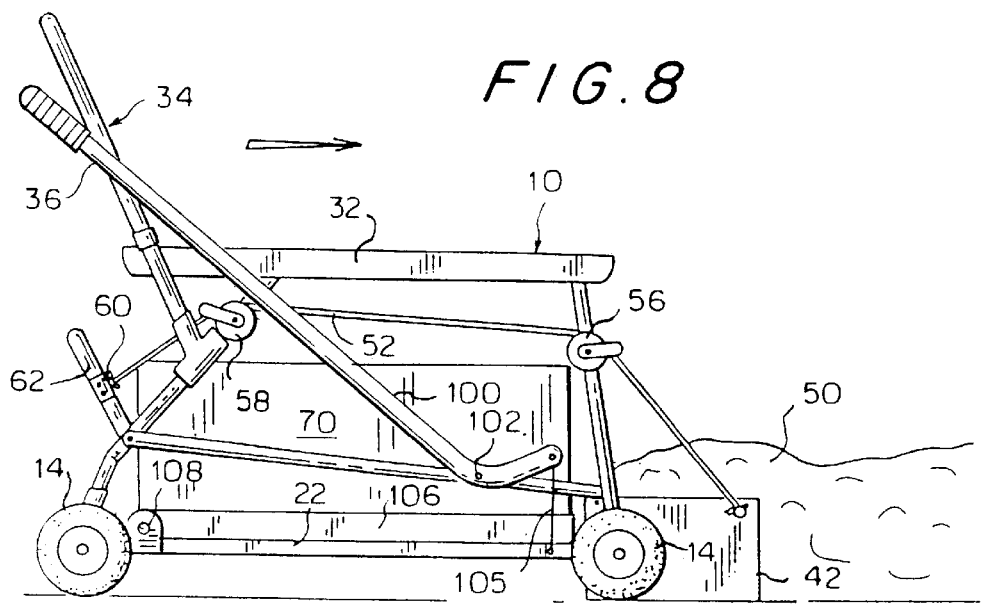
FIG. 8 is a side view of another embodiment of the invention showing a container tilting arrangement in a container down position.
Figure 9:
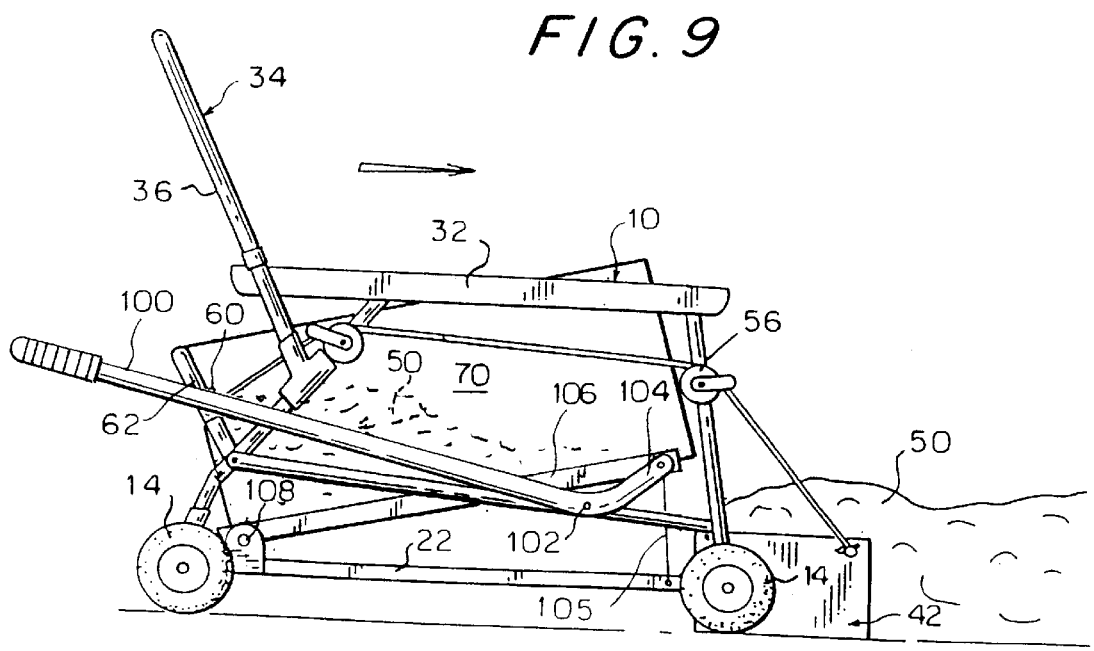
FIG. 9 is a view of the embodiment of FIG. 8 but showing the container tilted up.

Referring now to FIGS. 8 and 9, there is shown a second embodiment of the invention wherein the container (70) can be tiled from the horizontal position of FIG. 8 to the tilted position of FIG. 9 in which the load (50) shifts back in the container to make additional room at the open front of the container. This is accomplished by pivoting a lever (100) about a pivot (102) to lift a bent end (104) of the lever from its FIG. 8 to the FIG. 9 position. The bent end (104) of the lever (100) is attached by a link (105) to a pivotal lift (106) that is pivoted to the frame (16) at pivot points (108) on both sides of the frame. The link (105) is preferably a flexible link such as a length of cable. When the container (70) is raised the load (50) tends to slide back providing more room for material lifted by the scoop (42).

In summary, a manual dozer is provided which can scoop up and remove material (50) from one location to another, the manual dozer (10) being specifically of interest with respect to "shoveling" snow from sidewalks and other areas, but having use in transporting other materials such as dirt, debris, gravel and the like.

From the foregoing description, one skilled in the art can easily ascertain the essential characteristics of this invention and, without departing from the spirit and scope thereof, can make changes and modifications of the invention to adapt it to various usages and conditions.

I claim:

1. A manual dozer comprising:

a frame having a front and a rear, wheels for supporting the frame and allowing the frame to roll;

the frame including a handle extending upwardly from the frame adapted for pushing, pulling and steering of the frame by a user;

a container mounted on the frame, the container having a closed rear end and an open front end;

a scoop pivoted on the frame adjacent the front end thereof and extending in front of the open front end of the container, the scoop normally assuming a down position wherein a front edge of the scope is proximate the surface over which the manual dozer rolls, and a foot operated arrangement disposed beneath handle and attached to the frame for pivoting the scoop from the down position to a raised position in which the front edge of the scoop tilts back toward the opening in the container to move the scooped material into the container, whereby lifting of the scooped material is accomplished using force provided by the user's legs and weight.

2. The manual dozer of claim 1 wherein the arrangement for pivoting the scoop comprises a foot lever pivoted to the frame and having a link connected to the scoop.

3. The manual dozer of claim 2 wherein the linkage is a flexible line extending over pulleys or the frame and attached at one end to the foot lever and at the other end to the scoop.

4. The manual dozer of claim 1 wherein the container is removably mounted on the frame.

5. The manual dozer of claim 1 further including a cover removably mounted on the container.

6. The manual dozer of claim 1 further including a lift pivoted adjacent the rear end of the frame on which lift the container is mounted for tilting the front end of the container upwardly away from the front end of the frame when operated.

7. The manual dozer of claim 6 wherein the frame has a lever thereon for applying a lifting force to the lift to tilt the container.

8. The manual dozer of claim 7 wherein the lever extends beyond the rear of the frame for hand operation.

9. The manual dozer of claim 6 wherein the arrangement for pivoting the scoop is located at the rear of the frame and is operated by foot.

10. The manual dozer of claim 9 wherein the arrangement for pivoting the scoop comprises a foot lever pivoted to the frame and having a link connected to the scoop.

11. A manual dozer suitable for removing loads of snow or debris comprising:

a frame having wheels thereon adjacent front and rear ends thereof;

the frame including a handle projecting upwardly from the rear end of the frame for pushing, pulling and steering the frame;

a container having a closed rear end and an open front end removably mounted on the frame in pivotal relation thereto at the rear end thereof, wherein the container is tiltable for shifting a load of material therein toward the rear of the container;

a scoop pivoted to the front end of the frame, the scoop having a front edge for sliding under a load of material;

a foot lever pivoted on the frame at a location beneath the handle, the foot lever being connected to the scoop for pivoting the scoop by using force provided by the user's legs and weight to lift the load toward the container when the foot lever is pressed, and a hand lever pivoted on the frame and cooperating with the container to tilt the container with respect to the frame to cause a load in the container to slide toward the closed rear end of the container.

12. The manual dozer of claim 11 wherein the container rests on a tiltable lift which is mounted at a first end on the frame and wherein the tiltable lift is connected at a second end to the hand lever pivoted on the frame wherein when the hand lever is rotated about its pivot the lift is tilted to tilt the container.

13. The manual dozer of claim 11 wherein the foot lever is connected to the scoop with a flexible connector which extends over pulleys on the frame and is attached to the scoop.

* * * * *